United States Patent [19]
Taniguchi et al.

[11] Patent Number: 6,082,483
[45] Date of Patent: Jul. 4, 2000

[54] ELECTRIC POWER STEERING UNIT

[75] Inventors: Yoshiaki Taniguchi, Oi-machi; Tadao Kodaira, Maebashi; Atsushi Hirakata, Takasaki, all of Japan

[73] Assignee: Mitsuba Corporation, Gunma, Japan

[21] Appl. No.: 09/103,729

[22] Filed: Jun. 23, 1998

[30] Foreign Application Priority Data

Jul. 24, 1997 [JP] Japan ........................... 9-198028

[51] Int. Cl.7 ........................................... B62D 5/04
[52] U.S. Cl. ................................................. 180/444
[58] Field of Search ........................... 180/443, 444; 74/388 PS; 310/43, 89, 91

[56] References Cited

U.S. PATENT DOCUMENTS 4,660,669  4/1987  Shimizu ........................... 180/444
5,573,079  11/1996  Suda ................................. 180/444

Primary Examiner—Matthew C. Graham
Assistant Examiner—C. T. Bartz
Attorney, Agent, or Firm—McCormick, Paulding & Huber LLP

[57] ABSTRACT

An electric power steering unit comprises a rack-shaft 2 to be coupled to the guiding wheels of a vehicle, a housing A for slidably containing the rack-shaft 2 and holding therein a coupling section 6 for causing the teeth of the rack-shaft 2 to engage those of a pinion arranged on the steering column 5 linked to the steering handle of the vehicle and an electric motor 1 coaxially arranged around the rack-shaft 2, which the rotary force is transmitted to the rack-shaft 2 by way of a ball screw mechanism 3 as the steering assisting power. A yoke 7 of the motor 1 is formed integrally with the housing A, which simplifies the shape of the yoke 7 and reduces production cost.

3 Claims, 4 Drawing Sheets

ELECTRIC POWER STEERING UNIT

BACKGROUND OF THE INVENTION

1. Field of the Invention

This invention relates to an electric power steering unit to be used for a vehicle and, more particularly, it relates to a field of technology effectively applicable to electric power steering gears to be used for rack and pinion type steering systems.

2. Related Art Statement

In recent years, most vehicles are equipped with a so-called power steering gear, and various type power steering unit, such as a hydraulically or electrically operated type power steering unit has been designed to assist the steering power of the vehicle. In these electric power steering units, as one for applicable to rack and pinion type steering systems, a unit which the steering assisting power is obtained by an electric motor arranged coaxially with a rack-shaft, as Japanese Patent Application Laid-Open No. 8-98451, is known.

Such an electric power steering unit shown in FIG. 4, comprises an electric motor 52 arranged coaxially with a rack-shaft 51 so that the steering assisting power generated by the electric motor 52 is transmitted to the rack-shaft 51 by way of a ball screw mechanism 53. Then, the guiding wheels of the vehicle can be turned by utilizing both the manual steering power of the driver and the steering assisting power.

The rack-shaft 51 is linked to the guiding wheels (which hereinafter may simply be referred to as "the wheels") typically by way of tie rods or knuckle arms arranged at the respective opposite ends thereof and also linked to the steering column 54 that is coupled to the steering wheel (which hereinafter may be referred to as "the handle") by way of a rack and pinion gear so that it may be reciprocatively moved in the horizontal directions of FIG. 4 as the steering operation by the driver. The electric motor 52 has a cylindrical yoke 55 containing coaxially therein a cylindrical armature shaft 56 and a field device 57 and is fed with power from a power supply section 58. The field device 57 comprises magnets 59 arranged on the inner peripheral portion of the yoke 55 and an armature core 60 arranged on the outer peripheral portion of the armature shaft 56. The rotary power generated by the electric motor 52 is transmitted to the rack-shaft 51 as the steering assisting power by way of a ball screw mechanism 53 arranged at the left end of the armature shaft 56 in FIG. 4. Note that the armature shaft 56 is supported at a right side portion thereof by an angular bearing 65 held within housing 61.

The ball screw mechanism 53 has a well known constitution, which comprises a large number of balls 64 arranged between a nut section 62 and a screw section 63 thereof, the nut section 62 being press-fit into and caulked against the armature shaft 56. With this arrangement, the rotary power of the electric motor 53 is transmitted to the rack-shaft 51 by way of the nut section 62, the balls 64 and the screw section 63 to produce axial reciprocative power there, which is then used to assist the steering power.

Further, as shown in Japanese Patent Laid-Open No. 59-50864, there exists housing structure for a power steering unit, in which a yoke portion is formed as a cylindrical part made of iron put between right and left brackets. This type of power steering unit is similar to the above-described conventional one in that a motor is provided coaxially with a rack shaft arranged to pass through the center of the housing and auxiliary steering force of this motor is transferred to the rack shaft through a ball screw mechanism.

On the other hand, wheels may be steered to the limit during a servicing operation or when the steering wheel is turned while the vehicle is standing still. At that time, stoppers (not shown) of the tie rods connected to both ends of the rack shaft 51 are abutted against end portions of the housing 61 or the yoke 55 and movement of the wheels is restricted. In that case, impact force is applied to the housing 61 or the yoke 55 owing to abutting of the stopper, and, sometimes, it becomes such large force as more than several tons. In particular, at the time of servicing operation, a vehicle may be jacked up and wheels may be moved at a speed that can not be attained by ordinary operation of a steering wheel. In that case, very large force is generated in each part of the power steering unit, and accordingly, each component part is designed to be able to endure force of about 10 tons at maximum.

However, in the conventional power steering units, the yoke 55 and the armature shaft 56 are very complex in shape, and the above-described strength condition should be satisfied for such complex shape. As a result, not only the number of production processes is increased, but also high machining accuracy and high quality are required, thus increasing cost. In particular, at a stepped portion, there arises stress concentration. Accordingly, it is necessary to increase the strength by, for example, increasing wall thickness at that portion, and thus, working difficulty becomes large and product weight is increased owing to increase in the thickness.

Further, in the conventional power steering unit having the yoke as a separate part of the cylindrical shape, there exist two coupling portions (faucet coupling portions) between the yoke and the brackets, and accordingly, slight dimensional error tends to affect coaxial property of the housing as a whole.

SUMMARY OF THE INVENTION

An object of the present invention is to provide an electric power steering unit in which a yoke and a housing are formed integrally, so that shapes of the parts are simplified and decrease in production cost and product weight can be attained.

According to the invention, there is provided an electric power steering unit comprising a rack-shaft to be coupled to the guiding wheels of a vehicle, a housing for slidably containing the rack-shaft and holding therein a coupling section for causing the teeth of the rack-shaft to engage those of a pinion arranged on the steering column linked to the steering handle of the vehicle, an electric motor coaxially arranged around the rack-shaft to supply assisting power to the rack-shaft and a ball screw mechanism for connecting a nut section linked to the armature shaft of the electric motor with a screw section formed on the rack-shaft by disposing ball members therebetween and for transmitting the rotary power of the electric motor to the rack-shaft as assisting power for steering, wherein a yoke of said electric motor and said housing are formed integrally. By this construction, shapes of the parts can be simplified, and production cost and product weight can be reduced.

The above-described and other objects, and novel feature of the present invention will become apparent more fully from the description of the following specification in conjunction with the accompanying drawings.

DESCRIPTION OF THE PREFERRED EMBODIMENT

Figure 1:
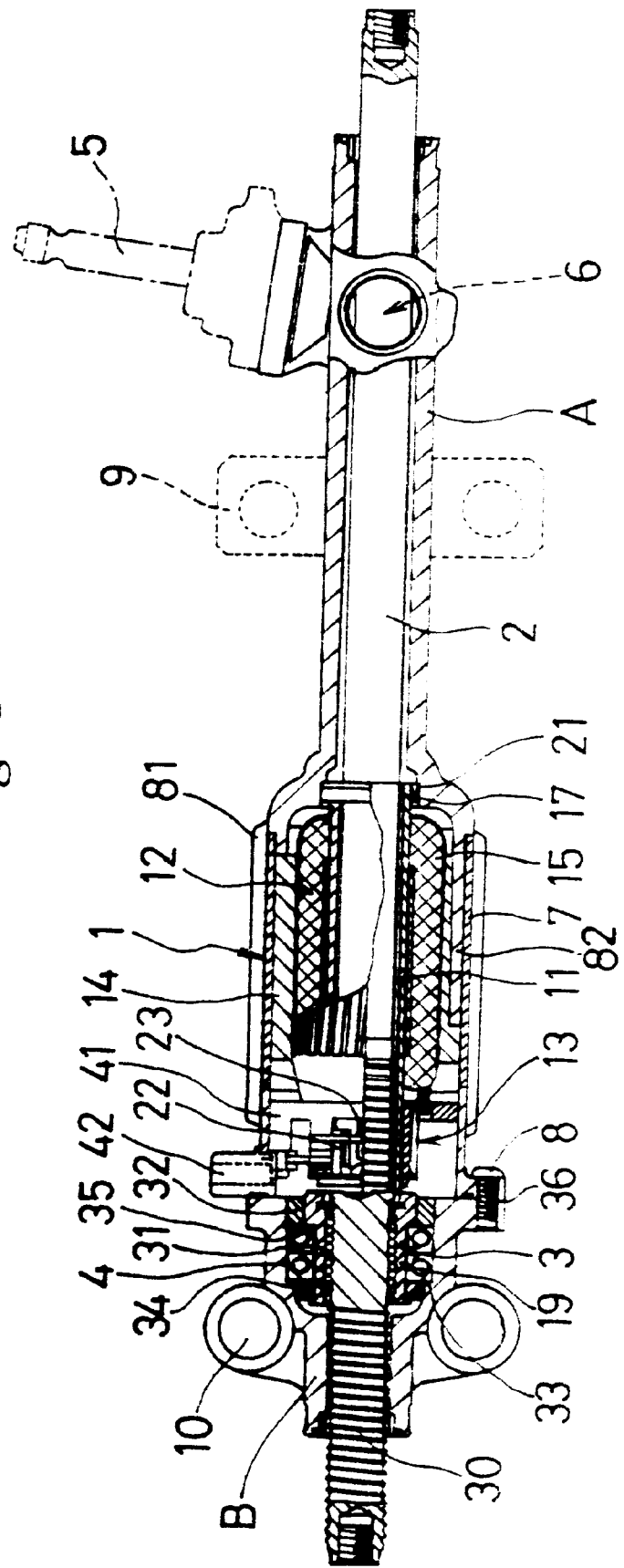
FIG. 1 is a schematic cross sectional view of an embodiment of power steering unit according to the invention, showing its overall configuration.
Figure 2:
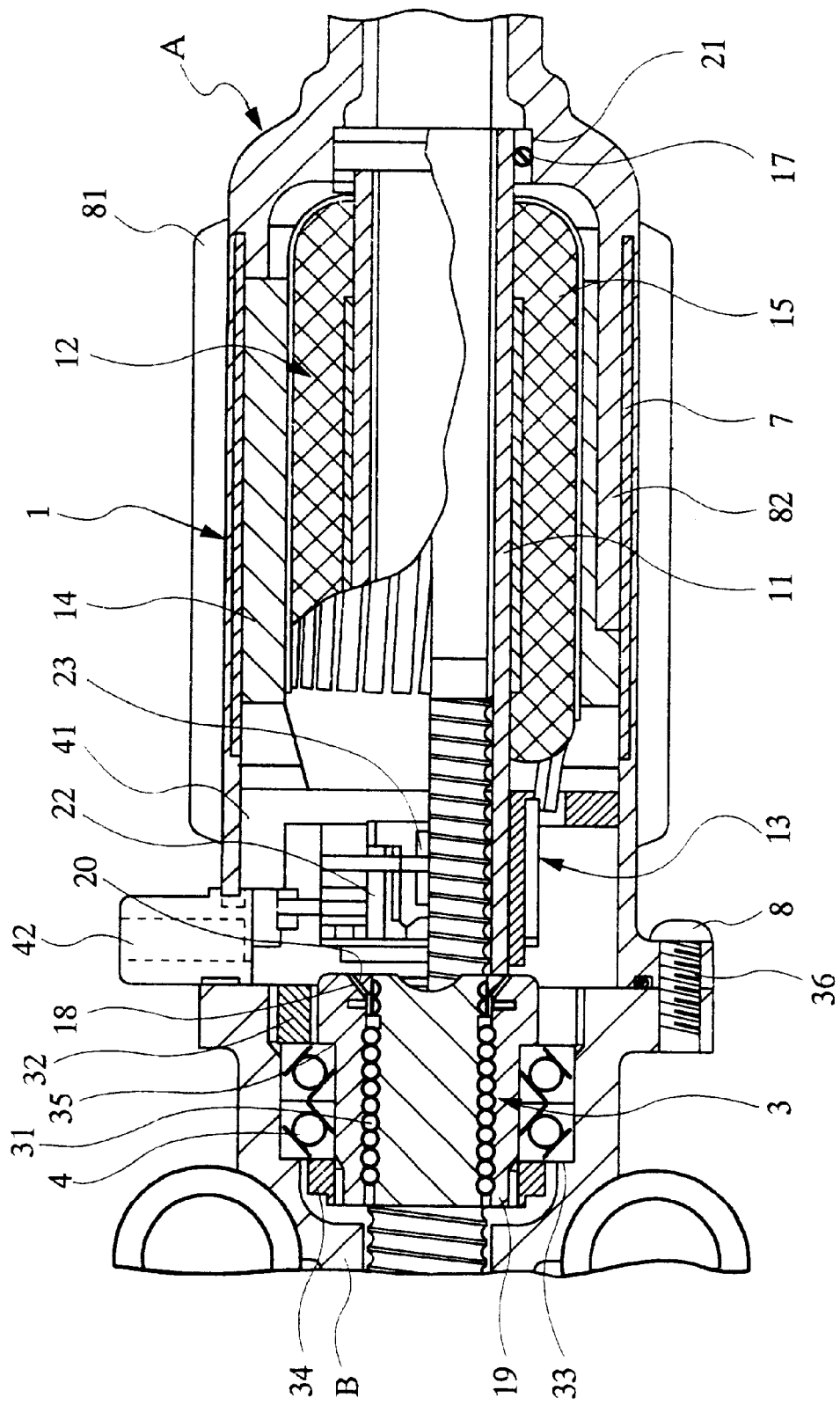
FIG. 2 is an enlarged schematic cross sectional view of the embodiment of power steering unit of FIG. 1, showing its principal area.

Now, the invention will be described in greater detail by referring to the accompanying drawings that illustrate preferred embodiments of the invention. FIG. 1 is a schematic cross sectional view of an embodiment of electric power steering unit according to the invention, showing its overall configuration. FIG. 2 is an enlarged cross sectional partial view of the embodiment of power steering unit of FIG. 1, showing its principal area.

As seen from FIGS. 1 and 2, the electric power steering unit (hereinafter referred to as "power steering unit") is provided with an electric motor 1 having a hollow central area and arranged around a rack-shaft 2 as in the case of the conventional power steering units shown in FIG. 4 and, for example, the unit is fitted to the steering gear of the wheels of a vehicle that are typically the front wheels. The steering assisting power generated by the electric motor 1 is transmitted to the rack-shaft 2 via a ball screw mechanism 3 to reduce the physical load for steering the vehicle on the part of the driver.

As shown in FIG. 1, the power steering unit is so constructed that a housing A which is integral with a yoke 7 of the motor 1 is connected with a housing B through a plurality of screws 8. The rack-shaft 2 is arranged in them in such a way that it may be moved to the right and the left direction in FIG. 1. Then, the unit is fitted to the vehicle main body by means of a bracket 9 and fitting holes 10 of the housing B and, at the same time, the wheels are linked to the respective ends of the rack-shaft 2 by means of tie rods or knuckle arms.

Figure 3:
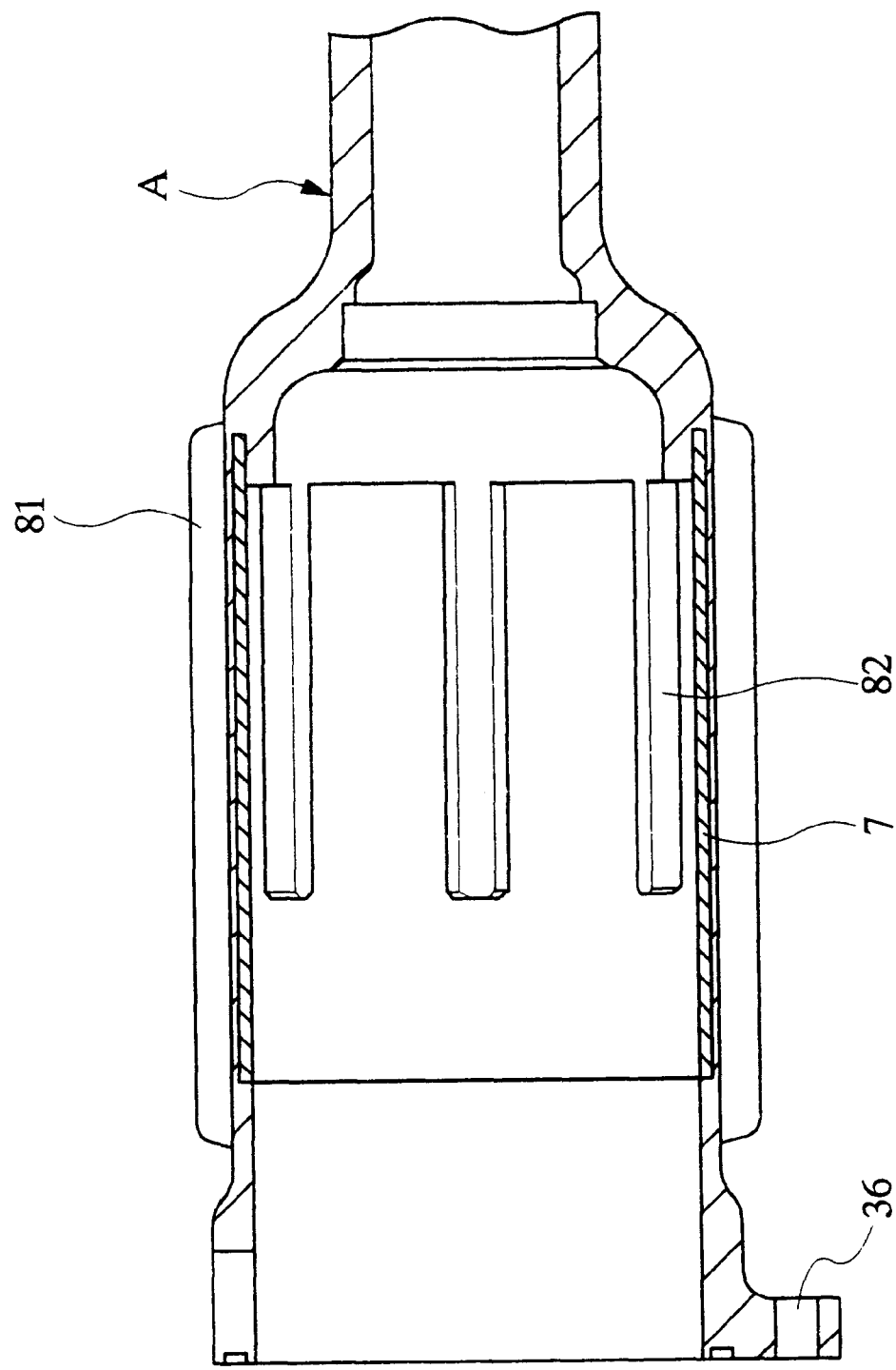
FIG. 3 is a schematic cross sectional view showing a main portion of a housing A.

The housing A is a hollow member of aluminum die casting, and is mounted to the vehicle body through the bracket 9, with elastic body such as rubber between them. FIG. 3 is a sectional view showing construction of a main portion of the housing A, illustrating a state of the housing A only, before the motor 1 is assembled into. As shown in FIG. 3, into this housing A, the yoke 7 of the motor 1 is cast integrally during a housing manufacturing process, and as the yoke 7, simple one of cylindrical shape is employed.

Further, on the outer peripheral side of the housing A, are provided a plurality of radiation fins 81, to improve heat dissipation of the motor 1. This is possible because the housing A is made of aluminum die casting, and the yoke 7 is cast into the housing A, so that projections can be easily provided on the outer side of the yoke 7. Of course, however, it is not necessary to provide the radiation fins 81.

On the right end side of the housing A seen in FIG. 1, a coupling section 6 is arranged for coupling the rack-shaft 2 with the steering column 5 of the vehicle that is further linked to the steering wheel. In this coupling section 6, a pinion (not shown) arranged on the steering column 5 and the teeth of a rack (not shown) arranged on the outer side portion of the rack-shaft 2 are engaged with each other so that the rotary motion of the steering column 5 is converted into a reciprocative motion of the rack-shaft 2 that moves right and left direction in FIG. 1. Note, a torque sensor (not shown) is arranged on the coupling section 6 to detect the torque of the steering column 5 so that the power output of the electric motor 1 may be controlled as a function of the detected torque.

The electric motor 1 has a cylindrical yoke 7 containing coaxially therein a cylindrical armature shaft 11 and a field device 12. The rack-shaft 2 is assembled to run through the inside of the armature shaft 11. In that case, the armature shaft 11 is formed generally in a cylindrical shape, which is more simplified in comparison with the conventional one shown in FIG. 4.

The field device 12 comprises a plurality of magnets 14 arranged on the inner peripheral surface of the yoke 7 and an armature core 15 arranged on the outer peripheral portion of the armature shaft 11 and is fed with electric power from a power supply section 13.

The yoke 7 is a hollow and cylindrical member made of iron and having a profile of a cylindrical pipe with a substantially constant thickness. As described above, the yoke 7 is cast into the housing A. Thus, in the apparatus of FIG. 1, a simple cylindrical pipe is satisfactorily used as the yoke 7, and accordingly, production cost for the yoke can be largely reduced in comparison with the conventional apparatus shown in FIG. 4.

The magnets 14 of the field device 12 operate as field poles and are arranged peripherally at regular intervals in the yoke 7. A plurality of projections 82 are formed in the inside of the housing A for fixing the magnets. Each magnet 14 is fixed between the projections 82.

The armature shaft 11 is held at an end thereof (the right side end in FIGS. 1 and 2) by a bearing 17 fitted to the housing A and provided on the other end (the left side end in FIGS. 1 and 2) with a tapered spline 18, which is engaged with a corresponding spline 20 formed at an end of a nut section 19 of the ball-and-screw mechanism 3 so that the rotary motion of the armature shaft 11 is transmitted to the nut 19.

A rubber member 21 is fitted to a right side portion of the bearing 17 to urge the armature shaft 11 against the nut 19 by means of the elastic force of the rubber 21. Thus, the spline 18 is urged against and engaged with the spline 20 so that the rotary motion of the armature shaft 11 is securely transmitted to the nut 19. Because of the rubber 21 arranged on the right side of the bearing 17, the armature shaft 11 is held in position but allowed to move to a small extent. Note that the rubber 21 can be replaced by an equivalent member that may be made of any appropriate material and have any contour so long as it axially urges the armature shaft 11. For example, it may be replaced by a coned disc spring, a wave washer or a member made of synthetic resin.

The power supply section 13 is designed to feed the armature with electricity and arranged on the left side in the figures (side of the housing B) of the field device 12. The section 13 comprises a commutator 22 rigidly secured to the armature shaft 11 and a brush 23 held in contact with the peripheral surface of the commutator 22 to provide electric contact points between them. The brushes 23 are held within respective brush holders 41 made of synthetic resin, to be in sliding contact with the commutator 22 at given pressing pressure by a spring not shown. Further, a coupler 42 is fixed to the housing A so as to project outside. Through this coupler 42, electric power is supplied to the brushes 23. The brush holders 41 and the coupler 42 may be integrated, to reduce the number of parts. Further, a controller may be installed on the outer periphery of the housing A covering the yoke 7.

Figure 4:
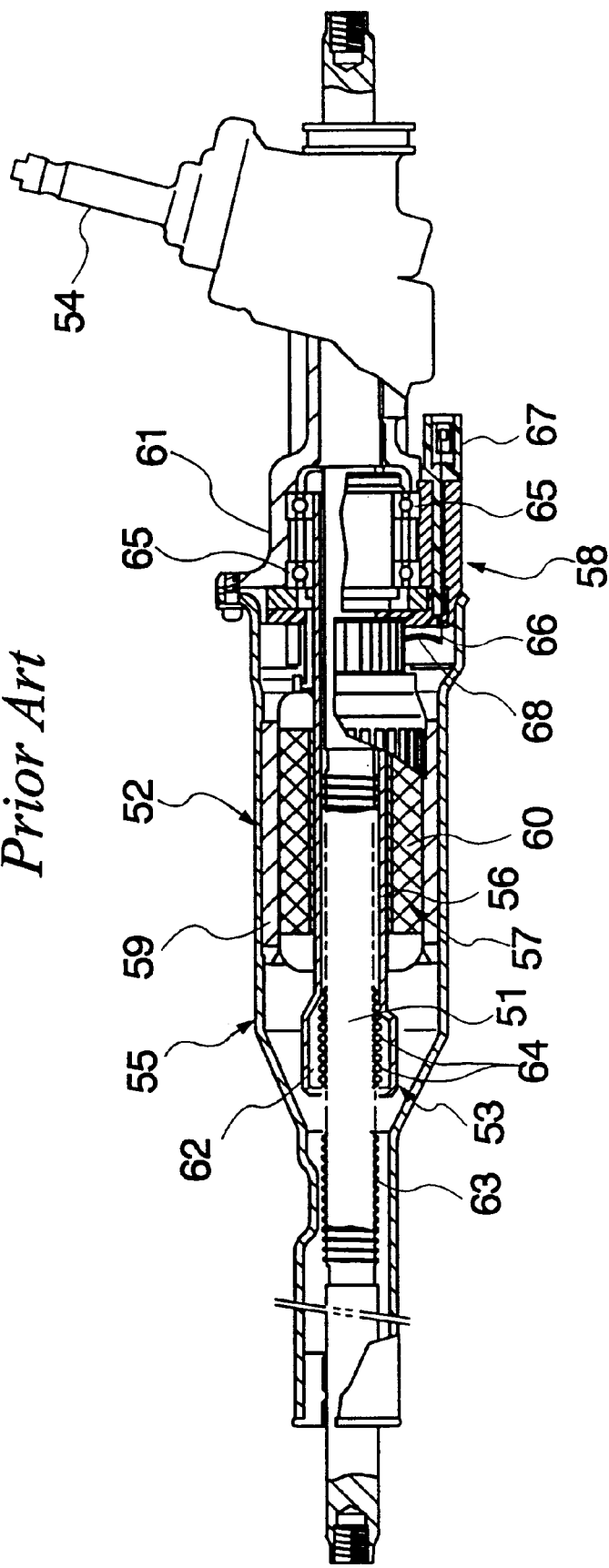
FIG. 4 is a schematic cross sectional view of a conventional power steering unit, showing its overall configuration.

Thus, in the present power steering unit, as obviously seen from comparison between FIGS. 1, 2 and 4, shapes of the yoke and the armature shaft are largely simplified as compared with the conventional ones, which makes their processing easier. Namely, the yoke 55 of FIG. 4 is weak at its constricted portion, which has been a bottleneck from the viewpoints of design, production, and cost. On the other hand, the yoke 7 of the present power steering is simply a cylindrical member, its strength requirement is much less, and it is very advantageous in production cost and weight as compared with the conventional one. Further, since the yoke 7 is integrated with the housing A, total length of the apparatus can be shortened. As for the armature shaft, it doe not have a constricted portion and its total length is short, so that its processing cost can be largely reduced. Further, its inertia can be reduced, so that impact force in critical steering can be moderated and response speed can be improved.

The housing B is, like the housing A, a hollow member typically made of aluminum die-cast and provided in the inside with a ball-and-screw mechanism 3. The ball-and-screw mechanism 3 per se is known and comprises a nut section 19, a screw section 30 formed on the outer peripheral wall of the rack-shaft 2 and a number of balls 31 arranged between the nut 19 and the screw 30. The rack-shaft 2 is supported by the nut 19 in such a way that its rotary motion around the axis of rotation is restricted but it is reciprocated right and left direction in FIG. 1 as the nut 19 is rotated.

In the present power steering unit, parts relating to the motor are concentratedly arranged within the housing A which is integrated with the yoke 7. Further, parts relating to the driving system such as the ball-and-screw mechanism 3 are concentratedly arranged within the housing B. In other words, in the present apparatus, the motor system and the driving system are arranged, being definitely separated. Accordingly, parts of each system are assembled separately, and thereafter the housing A and the housing B are assembled to obtain a finished product. Thus, it is possible to simplify the assembling processes and to make the production work efficient.

The nut 19 is axially rotatable relative to the housing B with an angular bearing 4 interposed therebetween and securely fitted to the housing B. Thus, unlike the conventional power steering unit of FIG. 4 wherein the nut of the ball-and-screw mechanism and the angular bearing are independently arranged, the nut 19 of the mechanism 3 and the angular bearing 4 are combined to form a unitary member and arranged in the housing B that is separated from the housing A in this embodiment of power steering unit according to the invention. Note that, the angular bearing 4 is securely held between a bearing holder ring 32 screwed into an opening of the housing B and a stepped section 33 formed in the housing B to restrict its axial movement. The relative axial movement of the nut 19 and the angular bearing 4 is restricted by another bearing holder ring 34 screwed into the left end of the nut 19 and another stepped section 35 formed on the outer peripheral wall of the nut 19.

A tapered spline 20 is formed at the right end of the inner cylindrical space of the nut 19 and engaged with a corresponding spline 18 of the armature shaft 11. Thus, the armature shaft 11 and the nut 19 are coupled firmly so that they can be handled as a unitary member. More specifically, the armature shaft 11 is supported by the bearing 17 and the nut 19 and the rotary motion of the armature shaft 11 is effectively transmitted to the nut 19. Therefore, as the armature shaft 11 rotates, the nut 19 is rotated accordingly to reciprocatively move the rack-shaft 2 right and left direction under the effect of the ball-and-screw mechanism 3.

Now, the embodiment of power steering unit of the invention operates in a manner as described below. Firstly, as the steering wheel is operated by the driver to turn the steering column 5 and the rack-shaft 2 is moved in the direction corresponding to the sense of rotation of the steering column 5 to carry out a necessary steering operation. At the same time, a steering torque sensor (not shown) detects the torque generated by the rotary motion of the steering column 5 and consequently the commutator 22 is supplied with electric power corresponding to the detected torque from the terminal plate 26 having the coupler 28 via the brush 23. As the electric motor 1 is driven to operate the armature shaft 11 and hence the nut section 19 coupled to it are rotated. As the nut section 19 rotates, the steering assisting power is transmitted to the rack-shaft 2 under the effect of the ball-and-screw mechanism 3, whereby the movement of the rack-shaft 2 is promoted and the steering power is assisted.

The rack shaft 2 of the present power steering unit is supported substantially by two points, i.e., the coupling section 6 of the housing A and the nut 19 of the ball-and-screw mechanism 3. This construction is different from the conventional unit, in which the rack shaft is supported substantially by three points, i.e., the coupling section 6 to the steering column 54, the ball-and-screw mechanism 53, and the angular bearing 65. Accordingly, in comparison with the apparatus of FIG. 4, requirement for parts machining accuracy and assembling accuracy are relaxed, and cost reduction is attained. In addition, it is possible to prevent generation of irregular sound and degradation of steering feeling owing to play or twist of the rack shaft.

Detailed description has hereinabove been give of the invention achieved by the present inventor with reference to the embodiments. However, the present invention should not be limited to the embodiments described above and may be variously modified within the scope not departing from the gist.

For example, a brushless electric motor may be used for an power steering unit according to the invention. If such is the case, the field device has a core and magnets respectively arranged on the yoke side and the armature shaft side while the power supply section has a circuit board comprising conducting means and a detector for detecting the angular position of the armature shaft. Additionally, the present invention is applicable not only to front wheels steering unit but also to rear wheels steering unit having the same constitution and mounting condition as the front wheels steering unit.

Further, in the above-described embodiment, the housing A is fixed to the vehicle body through the bracket 9, and the housing B through the fitting holes 10. Conversely, the housing B may be fixed through the bracket, and the fitting holes may be provided in the housing A. Thus, form of mounting to the vehicle body is not limited to the above-described embodiment.

In the above embodiment, the power supply section 13 is arranged on the left side of the field device 12 in the Figure, i.e., on the side of the housing B. However, the power supply section 13 may be arranged on the right side of the field device in the figure. However, better mounting accuracy and better rigidity of the armature shaft 11 are obtained when the position of the power supply section is closer to the housing B. Thus, the arrangement of the present apparatus is superior in that the commutator 22 can be assembled with better rigidity and better accuracy.

Finally, while the present invention is described particularly in terms of power steering unit of motor vehicle, it may be applied to any industrial machines and vehicles provided with a steering system.

The advantages of the present invention may be summarized as follows.

The yoke of the motor is formed integrally with the housing A, and accordingly, the yoke can be made from a simple cylindrical member and production cost is decreased. Namely, since there is no stepped portion in the yoke, production of the yoke is easy, and strength requirement is much less than the conventional one. The yoke can be designed and produced under less severe conditions for material and plate thickness, which contributes to improvement in productivity and to further reduction in cost. In addition, as the plate thickness is reduced, parts weight can be reduced.

Further, since the yoke is integrated with the housing A, total length of the apparatus can be shortened.

The motor system and the driving system are definitely separated, and the armature shaft of the motor and the nut of the ball-and-screw mechanism are coupled to each other. Accordingly, after the motor is assembled into the housing A and the ball screw and the angular bearing are assembled into the housing B, the whole apparatus can be made integral. Thus, quality control during the assembling becomes easier, and assembling processes can be simplified, to improve working efficiency.

Further, now that the apparatus has only one faucet coupling portion, it is possible to attain coaxial property on the same level as the conventional multistage yoke structure.

What is claimed is:

1. An electric power steering unit comprising a rack-shaft to be coupled to the guiding wheels of a vehicle, a housing for slidably containing the rack-shaft and holding therein a coupling section for causing the teeth of the rack-shaft to engage those of a pinion arranged on the steering column linked to the steering handle of the vehicle, an electric motor coaxially arranged around the rack-shaft to supply assisting power to the rack-shaft and a ball screw mechanism for connecting a nut section linked to the armature shaft of the electric motor with a screw section formed on the rack-shaft by disposing ball members therebetween and for transmitting the rotary power of the electric motor to the rack-shaft as assisting power for steering, characterized by:

a yoke of said electric motor is cased into said housing.

2. An electric power steering unit according to claim 1, characterized in that:

said housing is made of aluminum and manufactured by a die casting; and said yoke is made of iron.

3. An electric power steering unit according to claim 1, characterized in that:

said yoke is cast integrally into said housing during a process of housing manufacturing.

* * * * *